United States Patent [19]
Fastie

[11] Patent Number: 5,238,080
[45] Date of Patent: Aug. 24, 1993

[54] BRAKE PEDAL OPERATED MECHANISM FOR AUTOMATICALLY CONTROLLING SPEED OF A VEHICLE

[76] Inventor: William G. Fastie, 220 Greenspring Valley Rd., Owings Mills, Md. 21117

[21] Appl. No.: 850,440

[22] Filed: Mar. 12, 1992

[51] Int. Cl.⁵ .......................................... B60K 31/02
[52] U.S. Cl. ................................. 180/178; 180/170; 180/171; 192/1.27
[58] Field of Search ............... 180/170, 171, 174, 178; 188/382; 192/1.2, 1.27, 1.43

[56] References Cited

U.S. PATENT DOCUMENTS

| | | | |
|---|---|---|---|
| 2,423,006 | 6/1947 | Chambers et al. | 192/1.27 |
| 2,822,882 | 2/1958 | Campbell | 180/178 |
| 3,104,741 | 9/1963 | McDougal | 192/3.21 |
| 5,003,483 | 3/1991 | Hedstrom | 364/426.04 |
| 5,054,570 | 10/1991 | Narto et al. | 180/170 |
| 5,057,728 | 10/1991 | Dammeyer et al. | 192/84 AB |

FOREIGN PATENT DOCUMENTS

| | | | |
|---|---|---|---|
| 2650975 | 5/1978 | Fed. Rep. of Germany | 180/178 |
| 3043309 | 7/1982 | Fed. Rep. of Germany | 192/1.43 |
| 2238153 | 2/1975 | France | 180/171 |
| 0141334 | 5/1990 | Japan | 180/170 |
| 1641663 | 4/1991 | U.S.S.R. | 180/170 |

Primary Examiner—Charles A. Marmor
Assistant Examiner—Brian L. Johnson
Attorney, Agent, or Firm—Max Stul Oppenheimer

[57] ABSTRACT

A device for the efficient automatic controlling of the speed of a vehicle through a brake-pedal interface via an electronic switch to a vehicle's cruise control system, and the method for operating that device. The switch connects to the vehicle's brake pedal whereby successive taps of the pedal signal and control the cruise control through the switch.

8 Claims, 4 Drawing Sheets

BRAKE PEDAL OPERATED MECHANISM FOR AUTOMATICALLY CONTROLLING SPEED OF A VEHICLE

BACKGROUND PRIOR ART

In cars equipped with cruise control systems, the driver need not keep his foot on the gas pedal in order to maintain the existing speed. Under a range of highway and traffic conditions the existing devices decrease traffic hazards. One of the many advantages of these devices is that they can significantly reduce the occurrence of the driver inadvertently exceeding the speed limit The purpose and result of my invention is to greatly increase the range of highway and traffic conditions for which cruise control systems are useful.

In the cruise control systems currently employed in highway vehicles, however, the driver's right foot must be off the brake pedal (or pressure on the pedal will deactivate the system), which increases the braking time and thus creates a potential safety hazard. This hazard will increase if the right foot becomes entangled with the floor rug, the left foot or random debris. These defects greatly limit the road and traffic conditions for which existing systems are advantageous to such an extent that many drivers whole cars are equipped with the control seldom or never use it.

In current cruise control systems operating switches are often mounted on the steering wheel which requires one of the driver's hands to divert from steering in order to operate the switches and, if the wheel is turned, the switch position will vary and the driver's eyes may be diverted. Both diversions increase the driving hazards. In particular the eye diversion degrades the driver's monitoring of road conditions, traffic conditions, traffic lights and speed limit signs. In addition, many current systems sometimes result in accidental horn blowing and are virtually impossible to operate while wearing gloves.

Because of these limitations, current devices automatically disengage cruise control when, after braking, the vehicle speed is significantly below the set control speed. This is a necessary safety precaution for any automatic cruise control device. For example, it would be dangerous if, after a full stop, the driver were to actuate the "resume" function because the car would automatically accelerate from zero to the set speed.

The above defects of current systems place a large burden on the driver and lead to driver fatigue which further increases the driving hazards.

SUMMARY OF THE INVENTION

My invention is summarized as being a device for the efficient automatic controlling of the speed of a vehicle through a brake-pedal man-machine interface via an electronic switch to a vehicle's cruise control system, and the method for operating that device.

The objects of the invention are to extend the conditions and situations where the safe and efficient use of a vehicle's cruise control are available.

The invention comprises a switch connected to the vehicle's brake pedal whereby successive taps of the pedal signal and control the cruise control through the switch. The invention also allows the driver to rest his foot lightly on the pedal without deactivating the cruise control or activating the vehicle's braking system. This is a useful safety feature as the driver reaction time is reduced when an emergency stop is required.

DETAILED DESCRIPTION OF INVENTION

In a simple and economical form of my invention, a single brake pedal is used. The small force of the foot resting on the pedal (rest position) is insufficient to cause braking but sufficient to close a switch. A circuit between the switch and the cruise control mechanism allows the pedal to perform the function of the "cruise" button (which actuates the cruise control) and the "resume" button (which reactivates the control) after braking has occurred. The only other switch is an optional on-off switch which is preferably on the dash board. The circuit between the brake switch and the cruise control mechanism converts the brake switch and the cruise control mechanism converts the brake switch to a "smart switch" as described below. Alternatively, if the car is equipped with an on board vehicle computer, the computer could convert the brake switch to a "smart switch".

A potential fault of the switch is that the driver does not have a direct indication of when the switch is on B (FIG. 1, the rest position), and thus the driver might unintentionally activate the brake by going past B to C. This can be remedied in the instant invention by adding an output to the logic circuitry which turns on a one-shot driver alert indicator (a beeper or a flasher or both) whenever the switch goes from A to B. Thus a single alert signals that the resume control is activated and a double alert signals that the desired cruise speed has been commanded.

Figure 1:
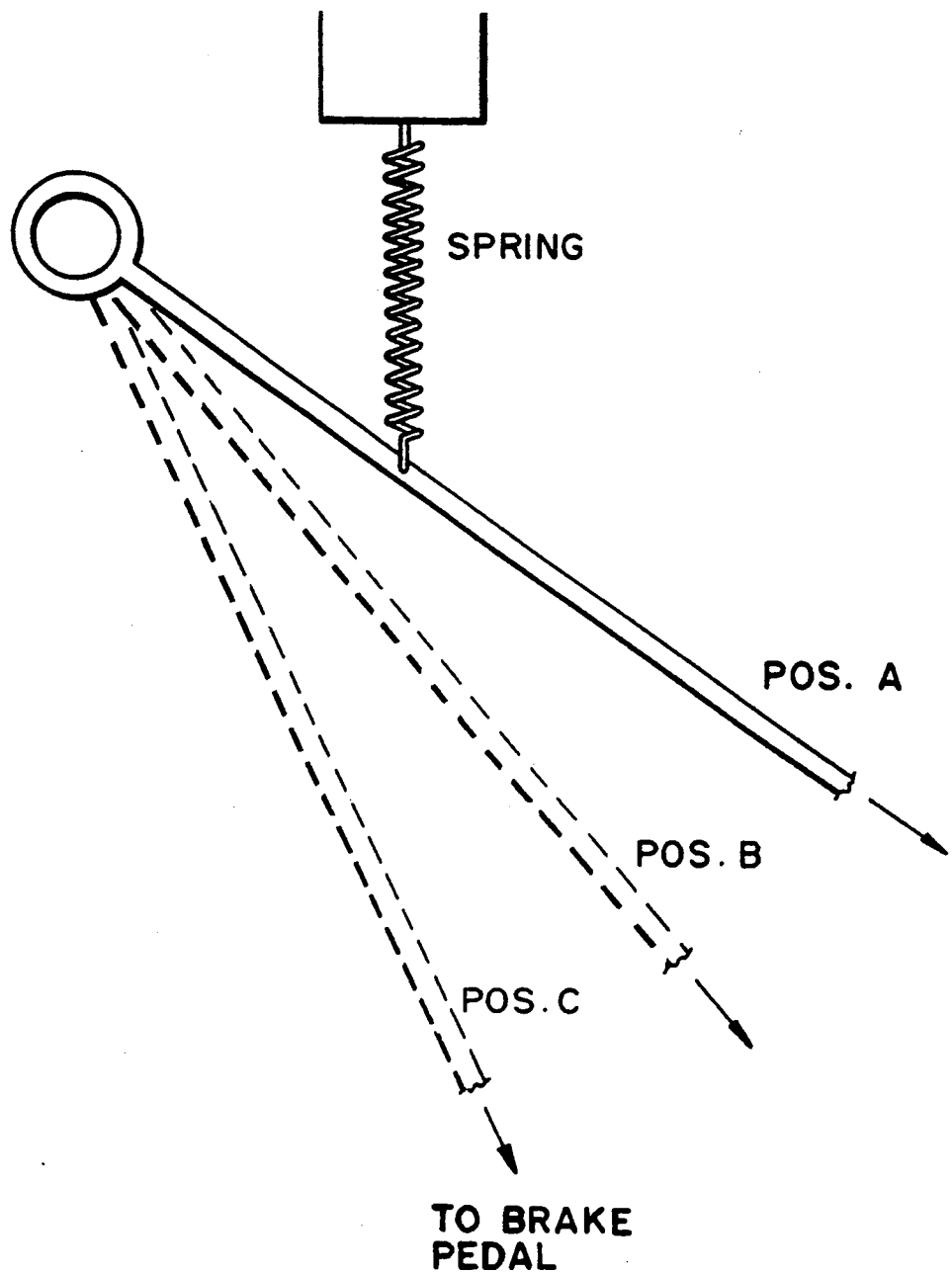
FIG. 1 shows the brake pedal.
Figure 2:
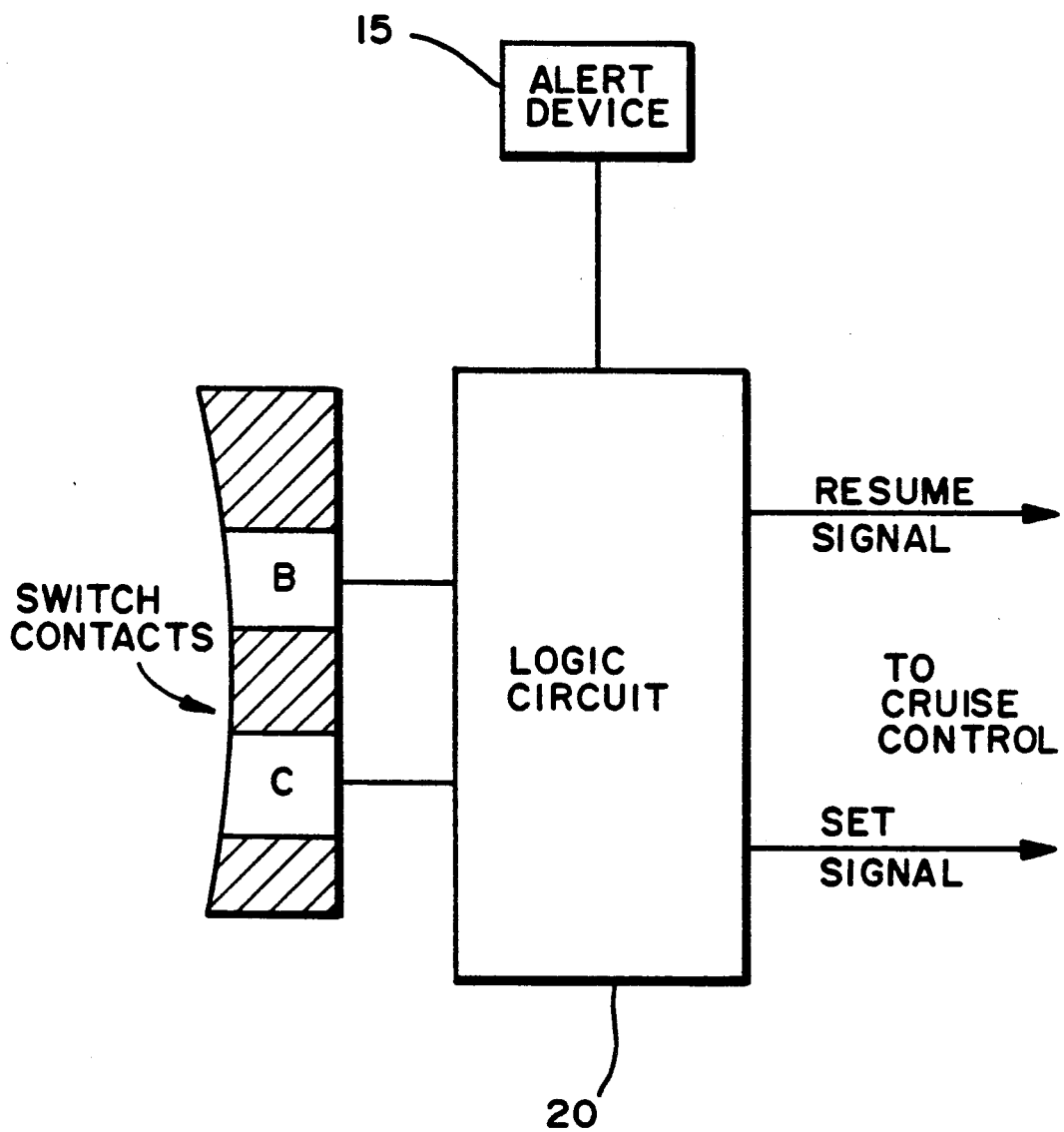
FIG. 2 shows a block diagram of circuit connections.

Referring to FIG. 1, the brake pedal is shown in three positions, A (foot off the pedal, switch open), B (foot on pedal, rest position, switch closed, brake not engaged), C (car braking). When engaged my invention operates in the following manner.

1. Set the vehicle to the desired cruise speed.
2. Lightly press the brake pedal. An audible or other signal may be provided to alert the driver that this step has been taken.
3. Very quickly remove the foot from the pedal and immediately press the foot pedal lightly again. Again, a signal may be provided to alert the driver. Step 3 should be completed within a second or so of the first alert.
4. The vehicle is now under cruise control and will remain so until the vehicle is braked or an engaging switch is turned to off.
5. If after braking, the driver wishes to resume the previously set cruise speed, the foot is then re-moved from the pedal and immediately light foot pressure is applied to activate the system (switch contact in position B). The foot may then remain on the foot pedal or may be removed without affecting the cruise speed.
6. To readjust the cruise speed to a new value repeat steps 1 through 3.

Note that if the foot inadvertently flutters to activate the "set" control the alert signal is activated but no change occurs because the speed has not changed.

Figure 3:
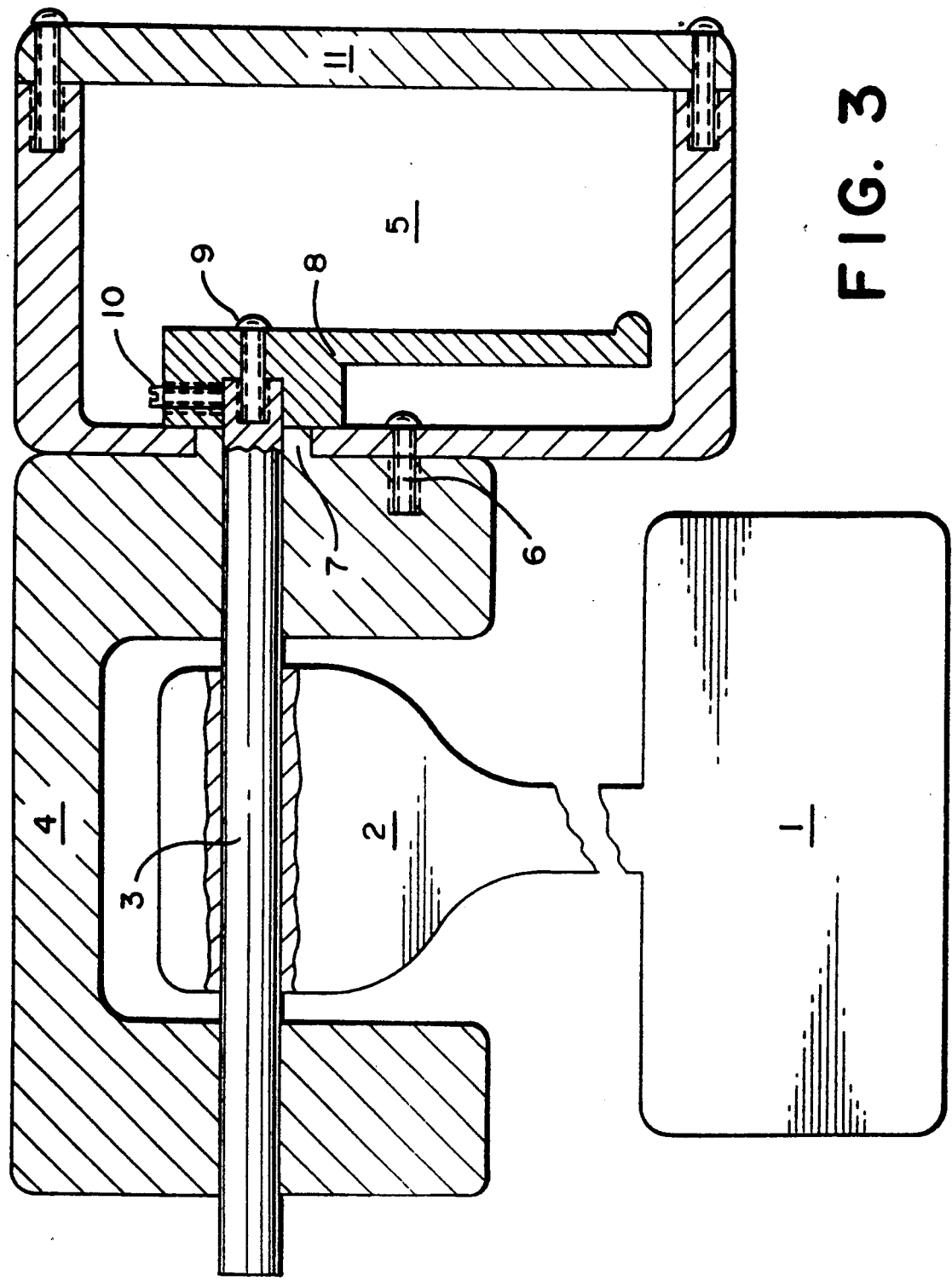
FIG. 3 shows the physical configuration of the brake pedal and connections.
Figure 4:
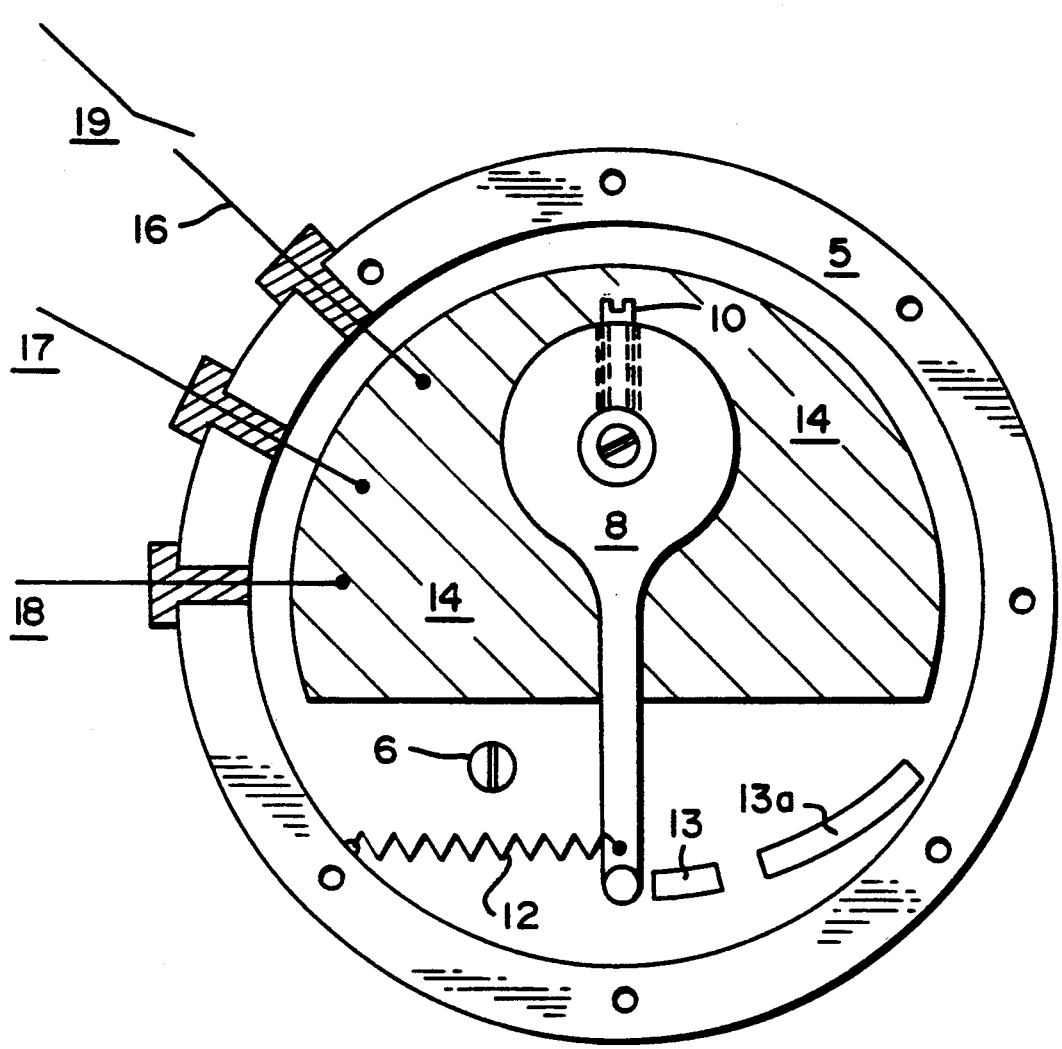
FIG. 4 is a side view of FIG. 3.

A preferred embodiment of my invention is shown in FIGS. 3 and 4. FIG. 3 shows the interface between the smart switch assembly and the brake pedal mechanism. The brake pedal (1) and the brake pedal arm (2) are fixed to a shaft (3) which can rotate in the bearing yoke (4). The shaft (3) is set so that a few degrees of rotation is required to set the switch arm on contact (13). The switch housing (5) is fixed to the bearing by several pins such as (6) and is electrically grounded to the yoke (4) (or, if the yoke is not grounded then to another vehicle electrical ground). The shaft (3) protrudes into the switch housing (5) through the hole (7). The switch arm (8) is held against the end of the shaft (3) by the pin (9). The switch arm (8) is pinned to the shaft (3) by the set screw (10). Access to the switch housing is provided by the coverplate (11).

More details of the switch system are shown in FIG. 4 which is a view perpendicular to the axis of shaft (3). The coverplate (11) is not shown.

The spring (12) holds the switch in the open position as shown. The spring (12) could also be exterior to the switch housing (5) and directly interface with the brake pedal mechanism, or may not be needed at all, depending upon the design of the brake pedal system. In any cause, slight pressure on the brake pedal (1) moves the switch arm (8) onto the contact (13) which, through the logic board (14) actuates the alert device (15). Power for the alert device and for the logic board circuitry (20) is provided through the wire (16) from an optional dashboard switch (19) to the vehicle battery positive terminal. One output signal from the logic board goes through wire (17) to the cruise control mechanism to actuate cruise control. The other output from the logic board goes through the wire (18) to actuate the resume mode of the cruise control system.

Whenever light foot pressure places the switch on contact (13) an alert device (15) signals the driver but the logic board delays sending a signal to the cruise control system for about a second or more. However, if within the delay time, the driver removes his foot from the pedal and returns it to reset the switch contact (13), the alert device signals the driver and the logic circuitry sends a signal through wire (17) to reset the cruise control speed.

When the vehicle has been braked the switch contact (13a) sends a signal to the logic circuit to ignore the next signal from contact (13) and to abort the signal to alert device (15). This avoids activation of the resume mode when not desired. However, if the resume mode is desired, the foot is removed from the pedal and immediately applies light foot pressure on the pedal to activate the beeper and the resume mode. (As can be understood by the above description.) All operations of the cruise control device are performed by the driver's foot manipulating the "smart switch" and with the driver's foot always on or at the brake pedal (except when manual acceleration is required). Therefore the driver can better continuously visually monitor the road conditions, traffic conditions, traffic light, traffic signs, speed limit signs and landmarks. Since the driver's visual attention is seldom diverted and a shorter reaction time is required, a much lower limit can be set for the speed that disengages the cruise control and therefore requires reacceleration and resetting the control after braking. In addition the driver can remain in cruise control safely under much more complicated road and highway conditions.

While the form of apparatus and method of operation constitutes a preferred embodiment of the invention, it is to be understood that the invention is not limited to this precise form and that changes may be made without departing from the spirit and scope of the invention.

I claim

1. A brake pedal apparatus for automatically controlling a vehicle's speed comprising:
    a) a brake pedal mechanism;
    b) a rotating shaft connecting a brake pedal to said brake pedal mechanism;
    c) a switch connected electrically to a cruise control device and to said brake pedal mechanism, whereby said brake pedal acts as an input device interface between a driver's foot and said cruise control device to set the vehicle speed at a desired speed.

2. An apparatus as in claim 1 further comprising a dashboard manual switch and indicator connected between a power supply and said cruise control device to control the flow of signals to said cruise control device.

3. An apparatus as in claim 2 further comprising: said brake pedal mechanisms housing a spring means, connected between said housing and said brake pedal mechanism, suitable for restraining said brake pedal mechanism from making electrical contact with said switch when a force not exceeding a first predetermined limit is applied to said brake pedal by a driver's foot.

4. An apparatus as in claim 3 whereby said spring means connects between said brake pedal mechanism and said cruise control through said switch so that said switch may be activated, without applying a vehicle's brakes, upon application of a force, not exceeding a second predetermined limit to said brake pedal.

5. An apparatus as in claim 4 whereby said switch activates a vehicle's braking system upon application of a force to said brake pedal exceeding said second limit.

6. An apparatus as in claim 5 further comprising:
    An alert means for indicating when a command has been accepted by said switch.

7. A method of automatically controlling a vehicle's speed equipped with a cruise control device connected through a switch to a brake pedal comprising the steps of:
    a) manually adjusting the vehicle to a desired speed;
    b) lightly depressing said brake pedal once;
    c) lightly depressing said pedal a second time within a preset time period to set the vehicle speed at said desired speed.

8. A method as in claim 7, sing the step of:
    a) lightly depressing said pedal once after braking to reacquire said desired speed.

* * * * *